UNITED STATES PATENT OFFICE.

LUDWIG H. REUTER, OF TORREÓN, MEXICO.

PROCESS OF PRODUCING CASEIN AND PRODUCT THEREOF.

1,167,434.   Specification of Letters Patent.   Patented Jan. 11, 1916.

No Drawing.   Application filed December 12, 1914.   Serial No. 876,982.

*To all whom it may concern:*

Be it known that I, LUDWIG H. REUTER, a citizen of the United States, residing at Torreón, in the county of Viesca and State of Coahuila, Mexico, have invented a new and useful Process of Producing Casein and Product Thereof, of which the following is a specification.

The object of this invention is to produce casein, and especially casein glue from milk and especially from buttermilk, in such a condition that the casein glue keeps better and for a longer period than casein glues obtained from casein which has been precipitated from milk by means of any one of the many acids which have been suggested for that purpose in the last fifty years.

A special object of this invention is to produce a glue or binder, which if used in connection with cold water paints, does not decompose as quickly as glues or binders prepared from casein which has been merely precipitated by sulfuric acid or by sour wheys containing lactic acid and being rich in bacteria.

A further object of this invention is to provide a process for making a stable glue, the sticking qualities of which have not been impaired by the addition of inorganic compounds, such as sodium fluorid.

A further advantage of the casein and of the glue made therefrom is the fact that when the dry glue is dissolved in water, the preserving agent contained therein or added, will not be precipitated by the agent which has been used as solvent for the casein and, though its acid radical may be transferred by chemical action, (for instance from its combination with a metal of the group of the alkalis or with ammonia to a metal of the group of the alkaline earth or earths) will not lose its power.

Now, I have carried on a series of investigations with the view of finding the best and cheapest method of obtaining on the large scale sterile casein, and glue made therefrom, and I have found that none of the bactericides, the use of which has been suggested, gives satisfactory results in connection with casein and casein glue.

I find that the proper way to precipitate casein from liquids rich in bacteria, and subject to rapid decomposition, such as milk, and especially buttermilk, consists in the application of a combination of precipitants, of which one serves as principal precipitant for casein, while the other possesses strong bactericidal properties, and has likewise the property of precipitating casein. I have found that the strongest bactericide, known to science, namely formic acid, is still more efficient if used in connection with sulfuric acid, and I have discovered that the combination of these two acids, both of which precipitate casein, is the proper means of precipitating casein from milk and especially from buttermilk, as all bacteria are destroyed by this combination of acids, which I have found is not the case if only sulfuric acid is used. Now I have found also that glue prepared from such casein still containing a slight excess of sulfuric acid, which cannot be removed quantitatively when casein is precipitated on the large scale, and containing some formic acid, is far superior to glues obtained from casein precipitated by means of sour wheys or by sulfuric acid alone; such glues prepared from casein precipitated by the above mentioned combination of acids, of which one is a strong bactericide, I have found to keep much better and for a longer period than glues so far described in the literature or used in practice.

A special feature of my glue, prepared from casein, precipitated by the combination of sulfuric acid and formic acid and containing still some of these two acids, is their full strength as far as the sticking properties are concerned. I have found that a smaller quantity of such glues has stronger adhesive properties than a larger quantity of a glue to which a relatively large percentage of an inorganic bactericide, such as sodium fluorid, has been added.

The use of casein precipitated by means of a combination of acids, such as sulfuric acid and formic acid, and containing still a small percentage of these acids and formate of casein (when precipitated casein is made on the large scale), I have found to be of advantage in the preparation of glues, whether alkalis or ammonia or salts like borax or sodium-phosphate are used as solvent in connection with water, or lime. This I use preferably, as even the formate of lime, $Ca(COOH)_2$, is soluble in water, and develops practically as much efficiency as a bactericide as the formates of the alkalis; for instance, formate of sodium NaCOOH, or formate of ammonia, $NH_4COOH$, which is not the case as stated above, if for instance, fluorid of ammonium is used, which by the action upon it, of the lime, is converted into insoluble fluorid of calcium, a compound void of any bactericidal properties.

The sterile character of casein, made as above described, can be still improved, if the precipitated casein is washed with water, to which some formic acid has been added. The addition of some formic acid to the wash waters has the further effect that the carbonates and bicarbonates respectively, of calcium, contained sometimes to an undesirable extent in hard country waters, are neutralized by the formic acid and converted thereby into formates, such as formate of calcium, $Ca(COOH)_2$, which is easily soluble in water and does not injure or contaminate, but rather improves the casein, if some of it is absorbed and left in the moist casein and contained then in the dried and finished casein and in the glue made therefrom; while on the other hand, insoluble lime salts precipitated from hard waters in the casein during the washing process, are not desirable impurities of casein.

A final advantage of the use of formic acid contained in the combination of acids used for precipitation and added to the wash-waters, is the tendency of the formic acid to combine with casein and to form a formate of casein which, representing a strong antiseptic compound, will naturally increase the stability of the casein, in which it is contained, and will make it easier to ship bulk quantities of precipitated casein, especially from warm or tropical climates, such for instance as from Argentina to European or American consumers.

Casein made in accordance with the old methods, viz. without the use of formic acid and contaminated often with lactate of casein was found to possess a peculiar odor, and to contain decomposition products which were not found in casein, precipitated in accordance with my process.

As an instance of manufacture I macerate buttermilk with an alkali, such as sodium carbonate to which I preferably add 0.5 to 1 per cent. of a formate, for instance formate of sodium, as soon as the casein has been converted into a soluble form, such as alkali caseinate, and as soon as the insoluble milk albumen has been properly separated, I filter by means of filter-press or otherwise. Then I heat the filtrate to about 70° C., and precipitate immediately the casein by the addition of sulfuric acid, to which about 5 per cent. of the 25 per cent. formic acid of the market has been added.

Then I collect the precipitated casein on a filter cloth, wash it with water, containing about 1 per cent. of the 25 per cent. formic acid of the market, subject the casein to a pressure, for instance, by running it through a curd-mill, and finally I dry it in a well ventilated drying closet, preferably in a vacuum drying chamber, if such is available. The same process, though without previous neutralization with an alkali, I use for precipitating casein from sweet skim-milk. Then I granulate or powder the casein, obtained as described, from buttermilk or skim-milk, and prepare the dry glue by adding preferably lime, for instance, 10 to 25 parts of lime for each 100 parts of casein, if the glue is used for veneering or for cold water paints, or by adding borax, for instance, about 12 to 15 parts of borax for each 100 parts of casein, if the glue is used for coated papers and the like. Finally I use the necessary quantity of water, to obtain glues of the consistency required for the various purposes.

I am aware of the fact that formic acid is liable to be decomposed by strong, concentrated sulfuric acid. For that reason I prefer to add the formic acid to the diluted sulfuric acid, and before it is used for precipitation. Instead of previously mixing the sulfuric acid, which may be diluted with any convenient quantity of water, preferably with about 5 to 10 parts of water, with the formic acid, both acids can be added separately to the liquid from which casein is to be precipitated, viz. sulfuric acid can be added first and then immediately the formic acid, which can be also diluted with water, if the liquid instead of being stirred by a mechanical stirring apparatus is stirred by means of a hand stirrer, which would not allow as good a distribution of the concentrated acid all through the liquid, as would be achieved if the acid is diluted. I am aware also of the fact that some or all of the formic acid, in concentrated or diluted condition, can be added first viz. before the addition of the sulfuric acid. This might be desirable, for instance, if the liquid, from which the casein is to be precipitated, has to be worked up quickly for the reason that the liquid shows already signs of initial decomposition.

Instead of using sulfuric acid and formic acid, also a combination of the sulfuric acid with a formate, for instance, a formate of an alkali, or an alkaline earth, or an earth can be used as precipitant. The formate may be added also to the neutralized liquid, from which the casein is to be precipitated, before the addition of sulfuric acid, as I have found that formates will hinder or postpone for some time decomposition of the liquors which are not required then to be worked up as rapidly as it would be necessary without the use of formates. I have found this addition of formates previous to the precipitation by sulfuric acid of great advantage for the manufacture.

I do not wish to limit myself to the use of the 25 per cent. formic acid of the market, as any other strength can be used, if applied proportionately. For instance, the 100 per cent. or 85 per cent. or 80 per cent. or 65 per cent. or 50 per cent. formic acid, or any other available strength. In some cases it might be desirable also to increase or decrease the quantity of formic acid, to be added to the sulfuric acid, or to be used to wash the precipitated casein. Instead of using sulfuric acid and formic acid, also a mixture of sulfuric acid, to which a formate has been added, can be used. For washing the casein instead of formic acid also a formate can be used, to which for the purpose of setting free the formic acid, a proportionate quantity of a stronger acid, such as sulfuric acid has been added. If the laborer has been careless and did not use the prescribed quantity of formic acid or of formate, for precipitating purposes or for washing the precipitated casein, it may be also desirable to add to the moist or dry casein or to the glue prepared therefrom additional quantities of formic acid or of formate respectively. It may be also desirable to incorporate into the dry glue mixture, comprising casein and alkalis, or casein and borax, or casein and lime an additional quantity of a formate, such as formate of sodium, or formate of potassium, or formate of ammonium, or formate of calcium.

Although I have described a preferred embodiment of this invention, I am aware that the details thereof may be modified within wide limits by a skilled chemist without departing from the scope of the invention as expressed in the claims. Therefore, I do not wish to be limited to all the details herein described, but What I do claim is:—

1. A process of making casein, consisting in macerating buttermilk with an alkali and a formate, filtering, precipitating the filtrate by means of a plurality of acids, washing the precipitate with water containing formic acid, drying and grinding the casein and mixing it with alkalis or lime.

2. A process of making casein, consisting in macerating buttermilk with an alkali and a formate, filtering, precipitating the filtrate by means of a mixture of sulfuric acid and formic acid, washing the precipitate with water containing formic acid, drying and grinding the casein and mixing it with alkalis or lime.

3. A process of making casein, which comprises precipitating the casein from buttermilk by a mixture of sulfuric acid and formic acid.

4. A process of manufacturing casein from milk products, which consists in separating the milk albumen and precipitating the casein from buttermilk by a mixture of an inorganic acid and an organic acid having bactericidal properties.

5. A process of making casein, which comprises precipitating the casein by sulfuric acid and a small percentage of formic acid, and washing the precipitated casein with water containing a small percentage of formic acid.

6. A process of making casein, which comprises precipitating the casein by sulfuric acid and formic acid, and washing the precipitated casein with water containing a formate.

7. A process of making casein, which comprises precipitating the casein by two precipitants, one of which has bactericidal properties, and washing the precipitated casein with water containing a formate.

8. A process of making casein from buttermilk, which comprises neutralizing with an alkali and a formate, precipitating the casein and washing it.

9. A process of making casein from buttermilk, which comprises neutralizing with an alkali and a formate, precipitating the casein by sulfuric acid and formic acid, and washing it.

10. A process of making casein from buttermilk, which comprises neutralizing with an alkali and a formate, precipitating the casein by sulfuric acid and formic acid, and washing it with water containing a small percentage of a compound containing the radical COOH and capable of producing carbon monoxid upon the abstraction of water therefrom by means of sulfuric acid.

11. A composition of matter comprising casein and a small amount of two casein precipitants, one containing the radical COOH and capable of producing carbon monoxid upon the abstraction of water therefrom by means of sulfuric acid, the latter constituting about five per cent. of the total amount of precipitants.

12. A composition of matter comprising casein, sulfuric acid, and formic acid, the amount of formic acid being about five per cent. of the amount of sulfuric acid.

13. A composition of matter comprising casein, sulfuric acid, and less than one per cent. of formate of casein.

14. A composition of matter comprising casein and less than one per cent. of formates.

15. A composition of matter comprising casein, less than one per cent. of formates, and less than five per cent. of formic acid.

16. A composition of matter consisting of casein, and small percentages of formates, formic acid, and sulfuric acid.

17. A composition of matter comprising casein and less than five per cent. thereof of formic acid.

18. A casein precipitate obtained from buttermilk and containing a small percentage of formic acid.

In testimony whereof I have hereunto set my hand, in the presence of two subscribing witnesses.

LUDWIG H. REUTER.

Witnesses:
 WILH. WINTER,
 BRUNO ZITTERMANN.